Jan. 10, 1967    S. D. MICHAELSON ET AL    3,297,144
ENDLESS BELT CONVEYOR AND BELT THEREFOR
Filed Dec. 21, 1964                    2 Sheets-Sheet 1
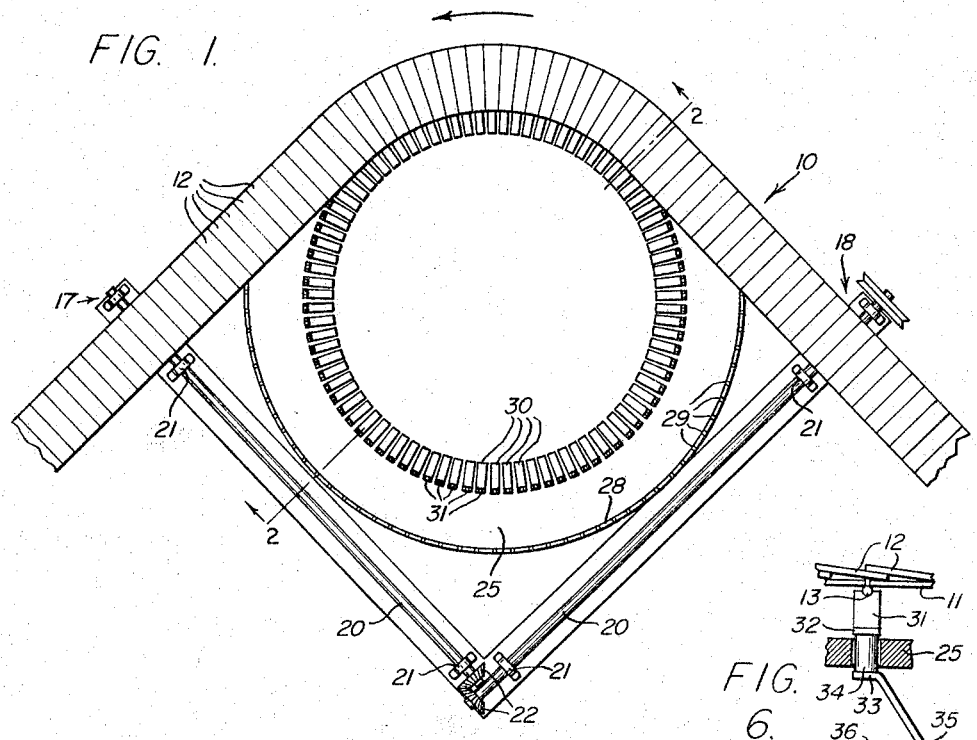
FIG. 1.
FIG. 6.
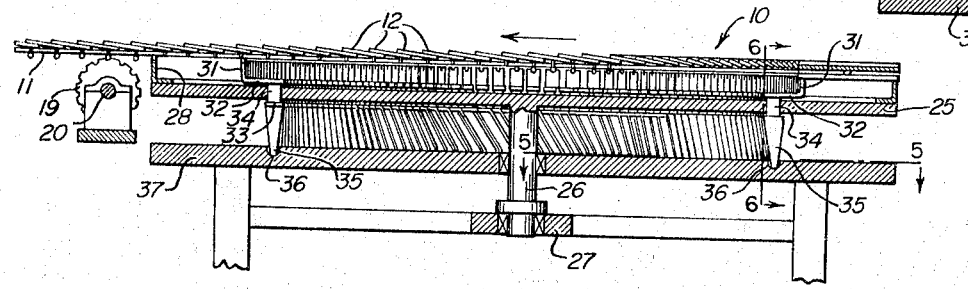
FIG. 2.
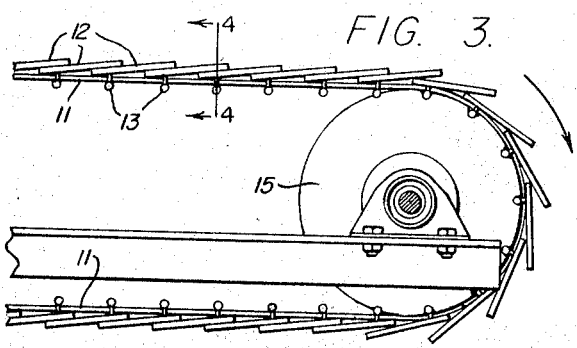
FIG. 3.
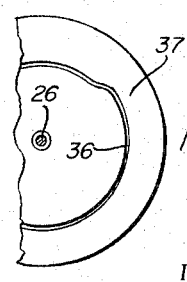
FIG. 5.
INVENTORS
STANLEY D. MICHAELSON
KARL F. EILERS
BY
ATTORNEYS Jan. 10, 1967  S. D. MICHAELSON ET AL  3,297,144
ENDLESS BELT CONVEYOR AND BELT THEREFOR
Filed Dec. 21, 1964  2 Sheets-Sheet 2
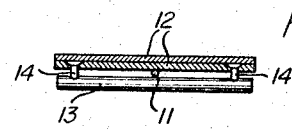
FIG. 4.
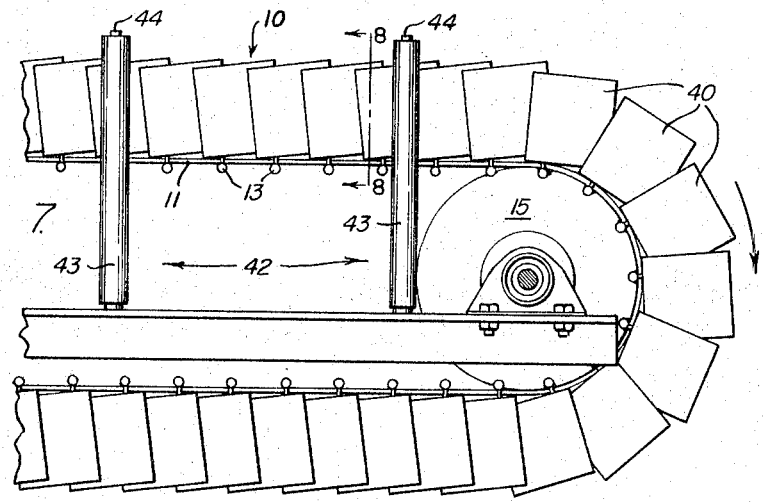
FIG. 7.
FIG. 8.
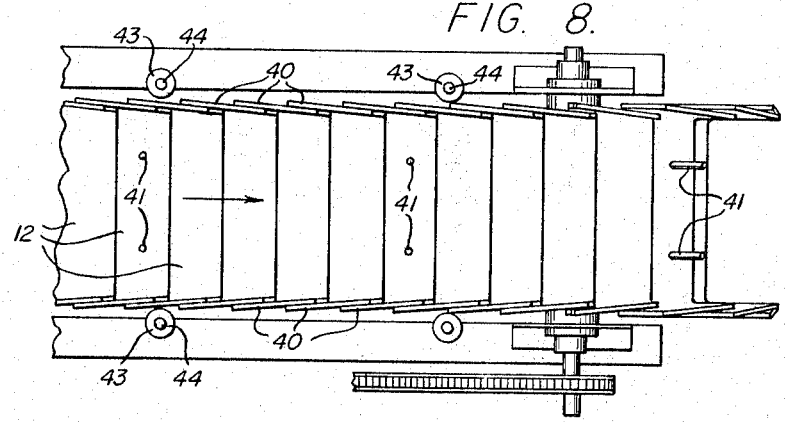
FIG. 9.
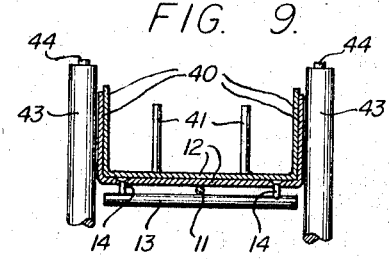
INVENTORS
STANLEY D. MICHAELSON
KARL F. EILERS
BY
ATTORNEYS

United States Patent Office 3,297,144
Patented Jan. 10, 1967

3,297,144
ENDLESS BELT CONVEYOR AND BELT THEREFOR
Stanley D. Michaelson, Salt Lake City, Utah, and Karl F. Eilers, Hayden Lake, Idaho, assignors to Kennecott Copper Corporation, New York, N.Y., a corporation of New York
Filed Dec. 21, 1964, Ser. No. 419,743
13 Claims. (Cl. 198—181)

This invention relates to endless belt conveyors and particularly to those having belts of special construction capable of traversing both vertical and horizontal curves.

Endless belt conveyors of this special type are not unknown. Several have been developed in the past for various purposes. For example, there are those shown in U.S. Patent No. 943,356, issued December 21, 1909 to C. O. Wyman, and U.S. Patent No. 2,543,368, issued February 27, 1951 to T. W. Jones et al. Yet, so far as we are aware, none has been able to travel around a curve on the horizontal without limitation of the degree of curvature and without requiring major changes in the belt and belt-supporting structure. Moreover, they have not been capable of satisfactorily carrying out high speed transportion (around one-hundred feet per minute and above) of large quantities of fine divided, bulk materials, such as are often encountered in the mining and metallurgical industries.

Accordingly, it is a principal object of the present invention to provide a high-speed, endless belt conveyor adapted to transport large tonnages of finely-divided bulk materials around vertical curves and around horizontal curves of unlimited degree of curvature as well as one of this type having a belt made up of readily replaceable wear sections adapted to be guided around such horizontal curves in a manner preventing loss of materials from the belt, even though the individual sections are normally free to fan out relative to one another.

Outstanding features of the invention reside in the provision of an endless, flexible, backing member carrying on its working surface a longitudinally extending series of transverse, sequentially overlapping, wear strips which have drive rods extending along and projecting from their undersurfaces. Such wear strips or plates are arranged to form a replaceable, protective lining for the backing member or belt proper. By the use of drive means and unique guide means cooperating with the drive rods to positively drive and guide the belt it is passed around horizontal curves in such a manner that the wear strips cannot fan open to allow material carried by the conveyor to fall through the wear surface. The guide means includes a rotating wheel and a fixed guide path that are determinative of the horizontal curve traversed.

Side walls and drag pins may be provided on the wear strips to increase the capacity and effectiveness of the conveyor, although these are not always essential for satisfactory conveying operations.

There are shown in the accompanying drawings specific embodiments of the invention representing what are presently regarded as the best modes of carrying out the generic concepts in actual practice. From the detailed description of these presently preferred forms of the invention, other more specific objects and features will become apparent.

In the drawings:

FIG. 1 is a fragmentary top plan view of the conveyor belt of the invention and of the guide means for guiding it around a horizontal curve;

FIG. 2, a fragmentary vertical section taken on the line 2—2 of FIG. 1;

FIG. 3, a fragmentary side elevation of the conveyor belt of the invention shown passing around a drive wheel at the discharge end of a conveyor;

FIG. 4, a vertical section taken on the line 4—4 of FIG. 3;

FIG. 5, a fragmentary horizontal section taken on the line 5—5 of FIG. 2;

FIG. 6, a fragmentary vertical section taken on the line 6—6 of FIG. 2;

FIG. 7, a fragmentary view similar to FIG. 3, showing side walls provided on the wear strips;

FIG. 8, a fragmentary top plan view of the conveyor belt shown in FIG. 6, showing drag pins on the wear strips; and FIG. 9, a vertical section taken on the line 8—8 of FIG. 6.

Referring now to the drawings:

In the illustrated preferred embodiments the conveyor belt is shown generally at 10. This belt includes a flexible backing member 11, which may be constructed of a fabric such as canvas or nylon, rubber, rope, woven or twisted wire rope, or any other sufficiently strong, flexible material, or composition of materials. As illustrated, backing member 11 is a wire rope.

Wear strips 12 each overlap slightly the strip ahead, in the direction the conveyor is to travel. These cover one side of the backing member 11 and extend laterally thereacross to form a superficial wear surface. Corresponding, laterally extending, drive rods 13 are spaced at the other side of backing member 11, with one rod positioned opposite each wear strip.

Each wear strip is anchored tightly to its corresponding rod, with the back member clamped between by screws 14 that extend through the wear strips and into tapped holes in the rods. The screw heads are countersunk in the wear strips to allow such strips to rest uniformly on each other and are preferably positioned beneath the overlapping strips to prevent wear on the screw heads. It should be obvious that, if desired, other means such as nuts and bolts, pins, or rivets, can be employed to clamp the wear strips and rods together. U-bolts and J-bolts that form a collar around the drive rods and extend through the wear strips have also been found very effective as clamping means. It should also be apparent that a group of wear strips can be fastened to a single drive rod, so long as sufficient flexibility is retained in the belt and enough rods are provided to transmit driving force to the belt and to cooperate with other structure as the belt is guided around a horizontal curve, as will be explained.

The wear strips completely cover one side of the endless backing member to form a material transporting surface, and, because of their overlapping relationship, they are easily passed around drive wheel 15. Any sag in the belt merely forces the overlapping wear strips more tightly together to prevent material being wedged between them.

Sprockets can be used to engage and drive the rods on the underside of the belt, but soft, resilient, wheels, which may be semi-pneumatic, or pneumatic, as illustrated, have been found more satisfactory since there is less frictional wear. The engagement of rods 13 with wheels 15 and 16 drives the belt, and the weight of the conveyor belt and the load carried thereby cause the rods to momentarily impress themselves partly into the wheels.

The wheels thus act in essentially the same manner as as sprockets, meshing with the drive rods to positively drive the belt.

The flexible backing member and the overlapping wear strips allow the belt to be led around a horizontal curve. This is accomplished by maintaining the distance, between the ends of the drive rods 13 on the outside of the curve fixed, and decreasing the distance between their ends at the inside of the curve, while supporting both the inside and outside ends during the entire travel of the rods around the curve. Since the distance between rods at the outside of the curve remains constant, no gaps are created in the belt through which the material being transported can fall.

The unique support means employed to guide the belt around the curve includes two sets of guide sprockets 17 and 18 positioned immediately ahead of and immediately following the curve, respectively. These sets of sprockets each include a pair of spaced sprockets 19 fixed to one end of a shaft 20 such that they mesh with the opposite ends of rods 13 as the rods pass over them. Shafts 20 are journaled for rotation within supports 21 and carry beveled gears 22 at their other ends. Beveled gears 22 of the shafts are in mesh, so that the sprockets of each set of sprockets will turn at the same speed. This insures the approach speed of the belt being the same as the leaving speed and prevents tension or sag developing in the conveyor belt due to any drive variations that may occur as it passes around the curve.

A large wheel 25 has a central shaft 26 that is journaled for rotation in support housing 27. Fixed guide cradles 28 radiate upwardly from the top face of wheel 25 and are spaced around the periphery of the wheel, so that the distance between adjacent fixed guide cradles is the same as the distance between adjacent rods of the belt when the belt is in its straight, flat, position. The end of each fixed guide cradle 28 is notched at 29 for engagement with the rods.

Movable guide cradles 30 (FIGS. 1, 2, and 6) each have a notched guide arm 31 that extends upwardly from the top face of wheel 25, arms 32 and 33 and shaft 34 that form a crank extending through wheel 25, and a follower arm 35 that extends downwardly away from the lower face of wheel 25 and into a guide groove 36 of a guide plate 37.

A movable guide cradle is provided corresponding to each fixed guide cradle, and each rod 13 rests in the notches of corresponding fixed and movable guide cradles as the conveyor belt passes around the horizontal curve.

As wheel 25 is rotated about its support shaft 26, follower arms 35 move within groove 36. Groove 36 is formed such that the follower arms 35, extend into the groove, and are positioned to extend the guide arms 31 normal to the longitudinal axis of the backing member 11 at the beginning and end points of the curve to be traversed. As follower arms 35 move within the groove the crank is rotated about the vertical axis formed by shaft 34. This swings the guide arms and reduces the distance between adjacent rods 13 at their ends on the inside of the curve as the belt passes around the curve, while the distance between adjacent rods at their ends on the outside of the curve remains the same as when the belt is extended flat and straight. As the distance between the rod ends at the inside of the curve is reduced, the corresponding wear strips slide over each other.

When they come to the end of the curve, adjacent rods are again spaced equidistant along their entire lengths, since the follower arms of the movable guide cradles continue in the groove 36 and the groove is shaped to pivot the guide cradles until their guide arms again extend normal to the longitudinal axis of the backing member.

Merely by changing the path of the groove 36 the degree and extent of curvature can be changed as desired.

In the present invention each strip overlaps slightly the one ahead in the direction of travel of the belt, and this arrangement results in a self-cleaning belt wherein material carried on the conveying surface of the belt ahead of each raised portion of each wear strip is dumped as the belt passes over a discharge wheel. Furthermore, as the belt continues around the discharge wheel the strips separate slightly to allow any material that may have become lodged between them to be discharged. Since the relationship of the strips is maintained constant at the outside of the curve there can be no plate separation to allow material to fall therebetween as a horizontal curve is traversed.

To better retain large quantities of loose material being conveyed on the belt, the wear strips may be provided with side panels 40 such as are shown in FIGS. 6–8. Side panels 40 are preferably formed integral with the wear strips, extend outwardly from the belt, and converge slightly from the rear edges of the wear strips toward their front edges so that the wear strips are still overlapping. The converging configuration of the side panels also allows the belt to traverse a horizontal curve even though equipped with wear strips having side panels, but the rate of curvature will necessarily be limited by the degree of convergence of the side panels. The side panels do not, however, limit the amount of curvature that can be traversed and an angle as great as 180°, or more, can be turned, so long as the rate of curvature does not cause the side panels to bind on one another.

Drag pins 51 (FIGS. 7 and 8) can also be affixed by welding or the like to spaced wear strips to provide a more positive engagement with the material. These are especially useful in dragging material from a discharge chute or bin onto the conveyor belt.

The wear strips with side panels and drag pins are attached to the backing member in the same manner as the wear strips without, and to replace them it is only necessary to remove the screws, bolts, etc. clamping the flexible backing member between the wear strips and the rods.

If desired, vertically positioned side rollers 42 can also be provided to stabilize the belt. These side rollers each consist of a rolling member 43 journaled about an upright shaft 44 that is carried by the conveyor support frame.

Whereas there are here illustrated and specifically described certain preferred constructions of apparatus which are presently regarded as the best modes of carrying out the invention, it should be understood that various changes may be made and other constructions adopted without departing from the inventive subject matter particularly pointed out and claimed herebelow.

We claim:

1. A conveyor belt for traversing both vertical and horizontal curves comprising an endless flexible backing member; wear strips on one face of said backing member, each wear strip slightly overlapping the one ahead in the direction of travel of the belt to form a material transporting surface; drive rods on the other face of said flexible backing member, said drive rods extending across said flexible backing member normal to the longitudinal axis thereof with each rod opposite a respective one of said wear strips; and means interconnecting each of said wear strips with its respective drive rod, the flexible backing member being clamped tightly therebetween.

2. A conveyor belt for traversing both vertical and horizontal curves according to claim 1, further including side panels at the sides of each of said wear strips, said side panels extending outwardly away from said belt and converging slightly from the rear of the wear strip toward the front thereof, whereby each of said wear strips overlaps slightly the one behind it in the direction of travel of the belt.

3. A conveyor belt for traversing both vertical and horizontal curves according to claim 1, wherein drag pins are fixed to and extend outwardly from the conveying surface of spaced ones of said wear strips.

4. A conveyor belt for traversing both vertical and horizontal curves according to claim 2, wherein drag pins are fixed to and extend outwardly from the conveying surface of spaced ones of said wear strips.

5. A conveyor belt for traversing both vertical and horizontal curves according to claim 1, wherein said flexible backing member is a wire rope.

6. In combination, a conveyor belt for traversing both vertical and horizontal curves and guide means for guiding the belt around horizontal curves comprising an endless flexible backing member; wear strips on one face of said backing member, each of said wear strips partially overlapping the one ahead in the direction of travel of the belt; drive rods on the other face of said flexible backing member, said drive rods extending across said flexible backing member normal to the longitudinal axis thereof and one rod being positioned opposite each of said wear strips; means interconnecting each of said wear strips with its oppositely positioned drive rod with the flexible backing member clamped therebetween; a wheel; guide cradles fixed to and spaced around the periphery of said wheel and extending upwardly from a top face thereof for engagement with one end of the drive rods; pivotally mounted guide cradles spaced from the fixed guide cradles and adapted to engage the opposite end of the drive rods; and means for pivoting said pivoted guide cradles to reduce the distance between adjacent drive rods as the belt passes around a horizontal curve.

7. A conveyor belt and guide means as in claim 6, wherein the means for pivoting the pivoted guide cradles comprises a follower arm fixed to each pivoted guide cradle and a fixed groove, said follower arms being guided in the groove.

8. A conveyor assembly including a conveyor belt for traversing both vertical and horizontal curves and drive means therefor comprising an endless flexible backing member; wear strips on one face of said backing member, each of said wear strips slightly overlapping the one ahead in the direction of travel of the belt; drive rods on the face of said flexible backing member, said drive rods extending across said flexible backing member normal to the longitudinal axis thereof and one rod being positioned opposite each of said wear strips; means interconnecting each of said wear strips with its oppositely positioned drive rod, with the flexible backing member clamped tightly therebetween; and drive means for said conveyor belt.

9. A conveyor assembly according to claim 8, wherein the drive means includes a sprocket meshing with said drive bars.

10. A conveyor assembly according to claim 8, wherein the drive means includes a soft, and resilient wheel engaging the drive rods.

11. A conveyor assembly according to claim 8, wherein the drive means includes an air filled resilient wheel engaging said drive rods.

12. A conveyor belt comprising: a flexible, endless backing member; a plurality of separate wear strips that are disposed on the outer surfaces of the backing member to extend transversely thereof, and that effectively cover the said backing member surface; and separate means securing each of said strips to said backing member and permitting limited angular movement of each of said strips relative to the backing member and relative to adjacent strips, upon curvilinear movement of the backing member, the securing means comprising rods that are disposed on the opposite surface of the backing member from the wear strips, to extend generally transversely of the backing member.

13. A conveyor belt in accordance with claim 12 wherein there is a separate rod for each of the wear strips and wherein the backing member is clamped between each wear strip and its associated rod.

References Cited by the Examiner
UNITED STATES PATENTS

| | | | |
|---|---|---|---|
| 421,186 | 2/1890 | Munden | 198—195 X |
| 967,424 | 8/1910 | O'Toole | 198—181 X |
| 2,201,665 | 5/1940 | Hogander | 198—189 |
| 2,219,724 | 10/1940 | Quick | 198—181 |

FOREIGN PATENTS 1,208,798  9/1959  France.

EVON C. BLUNK, *Primary Examiner.*

EDWARD A. SROKA, *Examiner.*